United States Patent
Suzuki et al.

(10) Patent No.: US 12,475,919 B2
(45) Date of Patent: Nov. 18, 2025

(54) DISK DEVICE HAVING DAMPERS ON AN ARM OF THE DISK DEVICE

(71) Applicants: Kabushiki Kaisha Toshiba, Tokyo (JP); Toshiba Electronic Devices & Storage Corporation, Tokyo (JP)

(72) Inventors: Yasuo Suzuki, Kanagawa (JP); Shunya Setoma, Kanagawa (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 0 days.

(21) Appl. No.: 18/586,257

(22) Filed: Feb. 23, 2024

(65) Prior Publication Data

US 2025/0014596 A1    Jan. 9, 2025

(30) Foreign Application Priority Data

Jul. 3, 2023    (JP) .................... 2023-109034

(51) Int. Cl.
*G11B 5/48*    (2006.01)
(52) U.S. Cl.
CPC .................... *G11B 5/4833* (2013.01)
(58) Field of Classification Search
None
See application file for complete search history.

(56) References Cited

U.S. PATENT DOCUMENTS

| | | | |
|---|---|---|---|
| 6,108,174 A * | 8/2000 | Adams ............ | G11B 5/4833 |
| 6,665,150 B2 * | 12/2003 | Smith ............. | G11B 5/5521 |
| 7,522,385 B2 | 4/2009 | Soga et al. | |
| 7,545,607 B2 | 6/2009 | Shimizu et al. | |
| 7,697,241 B2 | 4/2010 | Pottebaum et al. | |
| 7,929,254 B2 | 4/2011 | Soga et al. | |
| 8,161,626 B2 * | 4/2012 | Ikeji ............... | G11B 5/4833 29/603.03 |
| 8,345,387 B1 * | 1/2013 | Nguyen ........... | G11B 5/4833 360/265.9 |
| 9,153,261 B1 * | 10/2015 | Kerner ............ | G11B 5/4806 |
| 11,017,803 B1 * | 5/2021 | Yoshikawa ...... | G11B 5/4833 |
| 11,341,997 B2 * | 5/2022 | Tokizaki ......... | G11B 19/2018 |
| 11,348,607 B1 * | 5/2022 | Keshavan ....... | G11B 5/4826 |
| 11,710,507 B2 * | 7/2023 | Tokizaki ......... | G11B 5/4813 360/234 |

(Continued)

FOREIGN PATENT DOCUMENTS

| | | | | |
|---|---|---|---|---|
| JP | 4190497 B2 * | 12/2008 | ......... | G11B 5/4833 |
| JP | 2022125632 A * | 8/2022 | ......... | G11B 25/043 |

*Primary Examiner* — William J Klimowicz (74) *Attorney, Agent, or Firm* — Kim & Stewart LLP (57) ABSTRACT

A disk device according to one embodiment includes magnetic disks, arms each with a first depression, suspensions, and first dampers. The magnetic disks are aligned along a first rotation axis. The arms are aligned along a second rotation axis. Each arm includes a first side surface, a second side surface with a slit, a first surface, a second surface, a first seating surface, and a second seating surface. The first depression is open to the first side surface and the first surface, and located closer to the first rotation axis than the slit. Each of the suspensions is supported by the first seating surface or the second seating surface and partially accommodated in the slit. Each of the first dampers is attached to each of the arms along the first depression.

15 Claims, 9 Drawing Sheets

(56) References Cited

U.S. PATENT DOCUMENTS

| | | | |
|---|---|---|---|
| 11,955,150 B1* | 4/2024 | Tokizaki | G11B 5/4833 |
| 2005/0152070 A1* | 7/2005 | Funabashi | G11B 5/4833 |
| | | | 360/265.7 |
| 2008/0037178 A1* | 2/2008 | Nguyen | G11B 5/4833 |
| | | | 360/265.7 |
| 2008/0151433 A1* | 6/2008 | Soga | G11B 5/4833 |
| | | | 360/254 |
| 2010/0142081 A1* | 6/2010 | Funabashi | G11B 5/6005 |
| | | | 360/75 |
| 2013/0155547 A1* | 6/2013 | Eguchi | G11B 5/4833 |
| | | | 360/99.08 |
| 2015/0287428 A1* | 10/2015 | Kerner | B32B 7/12 |
| | | | 428/411.1 |
| 2015/0364155 A1* | 12/2015 | Kerner | F16F 1/3605 |
| | | | 267/141 |
| 2022/0230662 A1* | 7/2022 | Tokizaki | G11B 5/4813 |
| 2022/0262394 A1* | 8/2022 | Okamoto | G11B 5/4833 |
| 2022/0406333 A1* | 12/2022 | Keshavan | G11B 5/4813 |
| 2024/0339126 A1* | 10/2024 | Akatsuka | G11B 5/486 |

\* cited by examiner

DISK DEVICE HAVING DAMPERS ON AN ARM OF THE DISK DEVICE

CROSS-REFERENCE TO RELATED APPLICATIONS

This application is based upon and claims the benefit of priority from Japanese Patent Application No. 2023-109034, filed on Jul. 3, 2023; the entire contents of which are incorporated herein by reference.

FIELD

Embodiments described herein relate generally to a disk device.

BACKGROUND

A disk device such as a hard disk drive (HDD) typically includes, for example, magnetic disks, magnetic heads that read and write information from and to the magnetic disks, suspensions that support the magnetic heads, and a carriage that moves the magnetic heads and the suspensions. Such a disk device may further include dampers that dampen vibration of arms of the carriage, when it occurs.

The dampers are attached to, for example, the surfaces of the corresponding arms with a gap from the magnetic disks. Owing to the gap, each damper can be prevented from contacting the magnetic disk due to, for example, vibration. However, setting a larger gap between the damper and the magnetic disk may cause difficulty in manufacturing the disk device.

DETAILED DESCRIPTION

A disk device according to one embodiment includes a plurality of magnetic disks, a plurality of arms each with a first depression, a plurality of suspensions, and a plurality of first dampers. The magnetic disks are aligned along a first rotation axis and rotatable about the first rotation axis. The arms are aligned along a second rotation axis spaced apart from the first rotation axis. Each of arms rotates about the second rotation axis to be able to enter a gap between two neighboring magnetic disks of the plurality of magnetic disks. Each arm includes a first side surface, a second side surface with a slit, a first surface, a second surface, a first seating surface, and a second seating surface. The first side surface faces the first rotation axis. The second side surface is opposite to the first side surface. The first surface faces a first magnetic disk of the two neighboring magnetic disks. The second surface faces a second magnetic disk of the two neighboring magnetic disks. The first seating surface faces the first magnetic disk, and is spaced farther apart from the first magnetic disk and the second rotation axis than the first surface. The second seating surface faces the second magnetic disk, and is spaced farther apart from the second magnetic disk and the second rotation axis than the second surface. The first depression is open to the first side surface and the first surface, and located closer to the first rotation axis than the slit in a direction perpendicular to the first rotation axis. Each of the suspensions is attached to each of the arms while being supported by the first seating surface or the second seating surface and partially accommodated in the slit. The first dampers are configured to dampen vibration of the plurality of arms. Each of the first dampers is attached to each of the arms along the first depression.

First Embodiment

Hereinafter, the first embodiment will be described with reference to FIGS. 1 to 6. Note that, in this description, components according to embodiments and description of the components are described using a plurality of expressions depending on cases. The components and the description thereof are exemplary, and are not limited by the expression of this description. Components may also be identified from names different from those in this description. Furthermore, the components may be described using expressions different from the expressions in this description.

The following description defines "suppression" as, for example, prevention of occurrence of an event, an action, or an influence, or reduction of the degree of the event, the action, or the influence. Furthermore, the following description defines "restriction" as, for example, prevention of movement or rotation, or permission of movement or rotation within a predetermined range and prevention of movement or rotation beyond the predetermined range.

Figure 1:
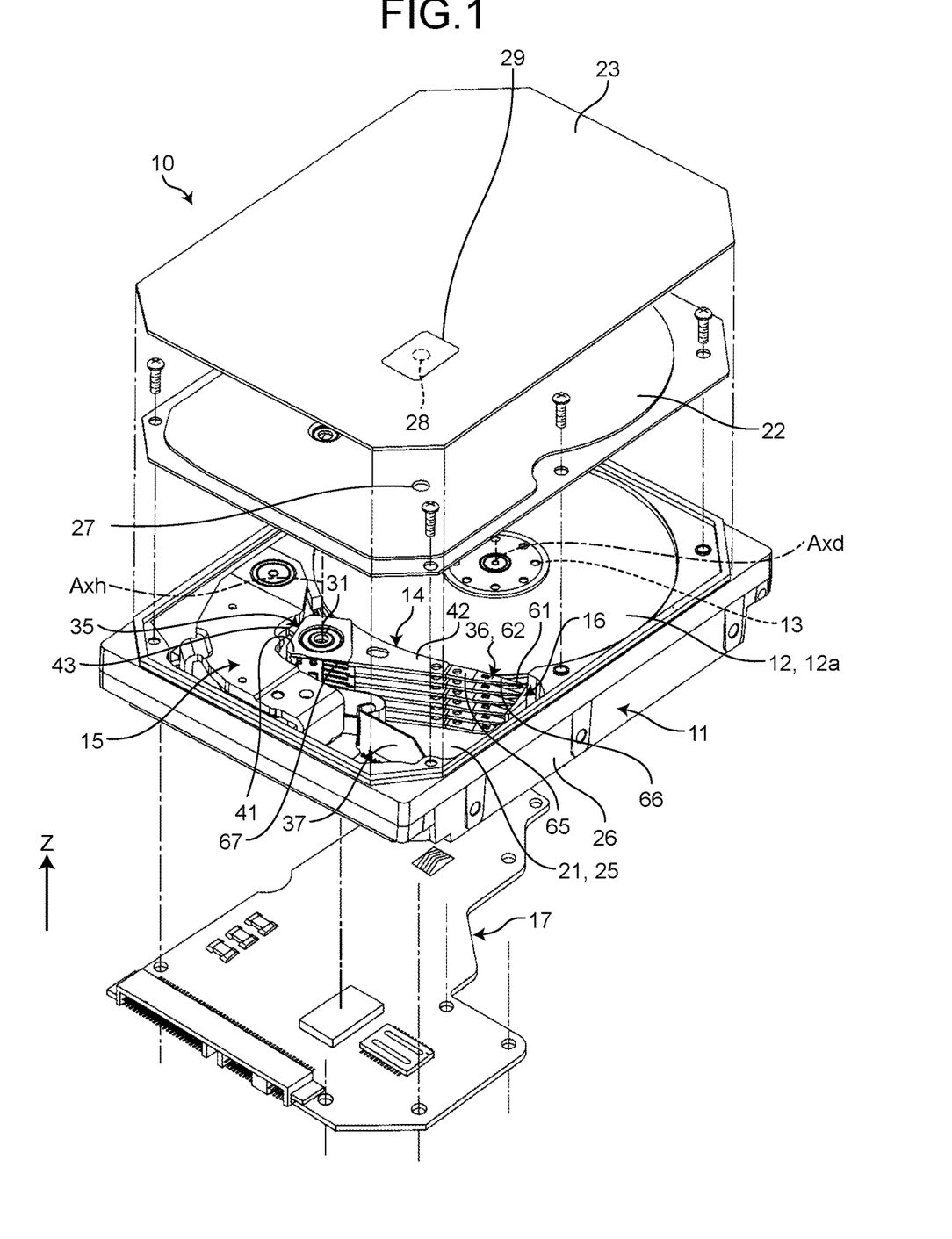
FIG. 1 is an exemplary exploded perspective view illustrating an HDD according to a first embodiment.

FIG. 1 is an exemplary exploded perspective view illustrating a hard disk drive (HDD) 10 according to the first embodiment. The HDD 10 is an example of a disk device, and may also be referred to as electronic equipment, a storage device, an external storage device, or a magnetic disk device.

As illustrated in FIG. 1, the HDD 10 includes a housing 11, a plurality of magnetic disks 12, a spindle motor 13, a head stack assembly (HSA) 14, a voice coil motor (VCM) 15, a ramped loading mechanism 16, and a printed circuit board (PCB) 17. The magnetic disk 12 may be also referred to as a disk or a platter.

As illustrated in FIG. 1, in this description, a Z axis and a Z direction are defined for convenience of description. The Z axis is provided along the thickness of the HDD 10. The Z direction is a direction along the Z axis and includes a +Z direction indicated by an arrow of the Z axis and a −Z direction that is an opposite direction of the arrow of the Z axis.

The housing 11 includes a base 21, an inner cover 22, and an outer cover 23. Note that the housing 11 is not limited to this example. Each of the base 21, the inner cover 22, and the outer cover 23 is made of, for example, a metal material such as an aluminum alloy. Note that the materials of the base 21, the inner cover 22, and the outer cover 23 may be different from each other.

The base 21 is formed in a substantially cuboid box shape opened in the +Z direction. The base 21 accommodates the plurality of magnetic disks 12, the spindle motor 13, the HSA 14, the VCM 15, and the ramped loading mechanism 16.

The base 21 has a bottom wall 25 and a sidewall 26. The bottom wall 25 is formed in a substantially rectangular (quadrangular) plate-like shape disposed substantially perpendicularly to the Z direction. The sidewall 26 protrudes in substantially the +Z direction from the edge of the bottom wall 25, and is formed in a substantially rectangular frame shape.

The inner cover 22 is attached to the end portion of the sidewall 26 in the +Z direction with, for example, a screw, and closes the base 21. The outer cover 23 covers the inner cover 22 and is attached to the end portion of the sidewall 26 in the +Z direction by, for example, welding.

A vent 27 is provided in the inner cover 22. Furthermore, the outer cover 23 is provided with a vent 28. After parts are attached inside the base 21, and the inner cover 22 and the outer cover 23 are attached to the base 21, air inside the housing 11 is removed from the vents 27 and 28. Furthermore, a gas different from air is filled inside the housing 11.

The gas filled inside the housing 11 is, for example, a low-density gas having a density lower than that of air, an inert gas having low reactivity, or the like. For example, helium is filled inside the housing 11. Note that another fluid may be filled inside the housing 11. Furthermore, the inside of the housing 11 may be kept at vacuum, a low pressure close to vacuum, or a negative pressure lower than the atmospheric pressure.

The vent 28 of the outer cover 23 is closed by a seal 29. The seal 29 seals the vent 28 airtight, and restricts the fluid filled inside the housing 11 from leaking from the vent 28 to the outside of the housing 11.

The plurality of magnetic disks 12 are formed in a disk shape disposed substantially perpendicularly to the Z direction. The plurality of magnetic disks 12 are aligned along an axis A×d of the magnetic disks 12 with gaps interposed therebetween. The axis A×d is an example of a first rotation axis. The axis A×d is a virtual axis that extends in substantially the Z direction.

Each of the plurality of magnetic disks 12 includes, for example, at least one recording surface 12a. Each of the plurality of recording surfaces 12a is the surface of the magnetic disk 12 facing substantially the +Z direction or the surface of the magnetic disk 12 facing substantially the −Z direction. The recording surface 12a is substantially the flat surface substantially perpendicular to the Z direction. The recording surface 12a is provided with a magnetic recording layer of the magnetic disk 12.

The spindle motor 13 supports the plurality of magnetic disks 12, and rotates about the axis A×d. The axis A×d is also a center axis of the spindle motor 13. The plurality of magnetic disks 12 are held by a hub of the spindle motor 13 by, for example, a clamp spring.

The housing 11 is provided with a support shaft 31 spaced apart from the magnetic disks 12 in a direction perpendicular to the axis A×d. The support shaft 31 extends from, for example, the bottom wall 25 of the housing 11 to substantially the +Z direction. The HSA 14 is rotatably supported on the support shaft 31.

The HSA 14 can rotate about an axis A×h. The axis A×h is an example of a second rotation axis, and is a virtual axis that extends in substantially the Z direction. The axis A×h is, for example, the center of rotation of the HSA 14, and is also the center axis of the support shaft 31. Hence, the axis A×h is spaced apart from the axis A×d of the magnetic disks 12 in a direction perpendicular to the axis A×d.

The HSA 14 includes a carriage 35, a plurality of head gimbal assemblies (HGA) 36, and a flexible printed circuit board (FPC) 37. The carriage 35 includes an actuator block 41, a plurality of arms 42, and a coil holder 43.

The actuator block 41, the plurality of arms 42, and the coil holder 43 are integrally formed of, for example, an aluminum alloy. Note that the materials of the actuator block 41, the arms 42, and the coil holder 43 are not limited to this example.

The actuator block 41 is supported by the support shaft 31 with a bearing interposed therebetween rotatably about, for example, the axis A×h. Consequently, the carriage 35 can rotate about the axis A×h.

The plurality of arms 42 protrude from the actuator block 41 in a direction substantially perpendicular to the axis A×h. Note that the HSA 14 may be divided, and the arms 42 may protrude from each of a plurality of the actuator blocks 41.

Figure 2:
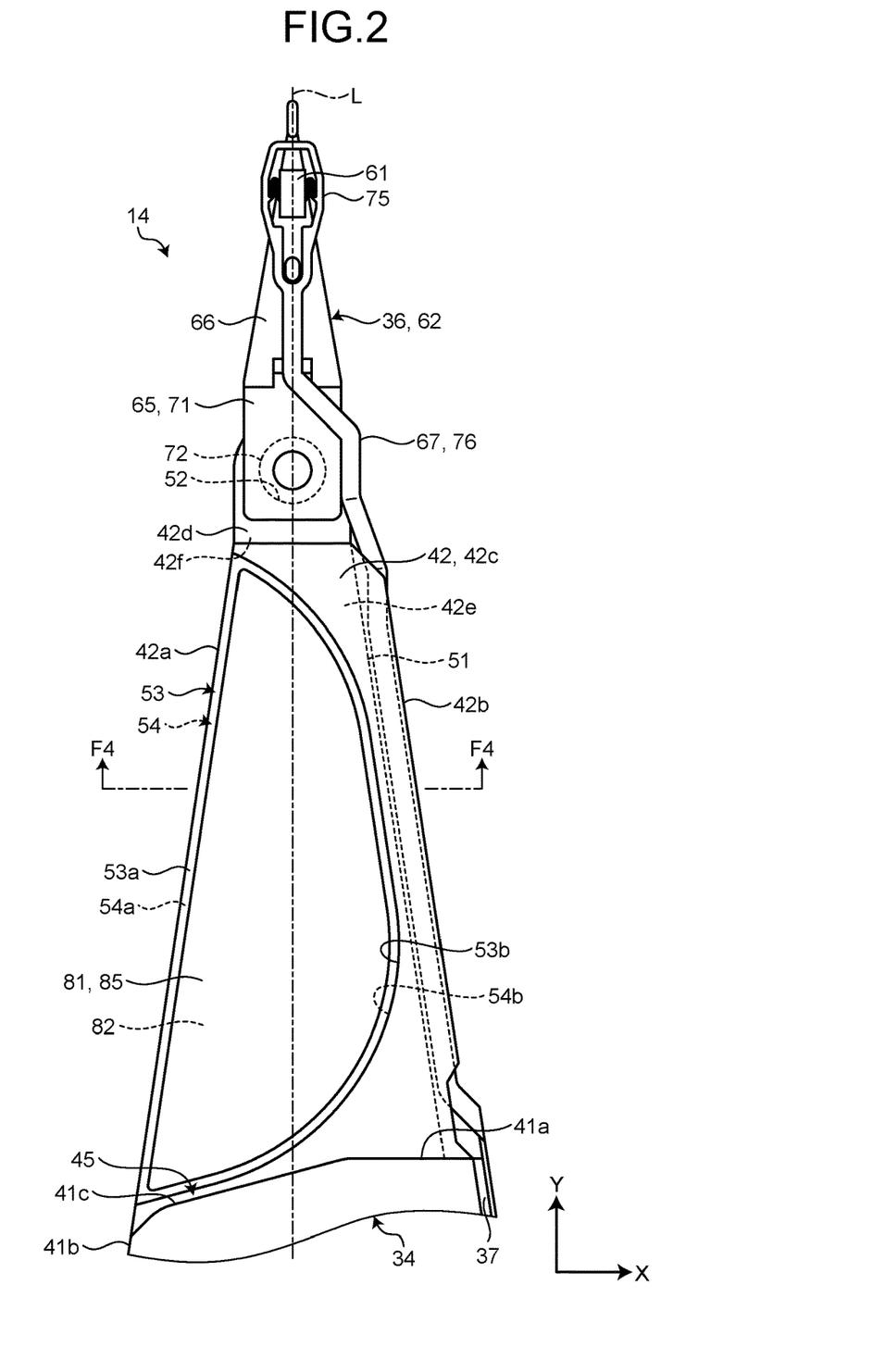
FIG. 2 is an exemplary plan view partially illustrating an HGA and an arm according to the first embodiment.

FIG. 2 is an exemplary plan view partially illustrating the HGA 36 and the arm 42 according to the first embodiment. As illustrated in FIG. 2, this description further defines an X axis and a Y axis for convenience of description. The X axis, the Y axis, and the Z axis are perpendicular to each other. The Y axis is provided along the arms 42. Furthermore, this description further defines an X direction and a Y direction. The X direction is a direction along the X axis and includes a +X direction indicated by an arrow of the X axis and a −X direction that is an opposite direction of the arrow of the X axis. The Y direction is a direction along the Y axis, and includes a +Y direction indicated by an arrow of the Y axis and a −Y direction that is an opposite direction of the arrow of the Y axis.

The plurality of arms 42 protrude from the actuator block 41 in the +Y direction. Hence, the Y direction is a longitudinal direction of the arms 42. The X direction is a lateral direction of the arms 42. The X direction and the Y direction change when the carriage 35 rotates about the axis A×h. The axis A×d of the magnetic disks 12 is spaced apart from the arms 42 in substantially the −X direction.

The actuator block 41 has a plurality of side surfaces 41a, 41b, and 41c. The side surface 41a faces substantially the +Y direction. The side surface 41b faces substantially the −X direction. The side surface 41c extends obliquely with respect to the X direction and the Y direction between the side surface 41a and the side surface 41b. The plurality of arms 42 protrude from the side surfaces 41a and 41c of the actuator block 41 in the +Y direction.

Since the side surface 41c extends obliquely with respect to the X direction and the Y direction, a notch 45 is provided in the actuator block 41. The notch 45 is provided, so that it is possible to prevent the actuator block 41 from contacting the magnetic disks 12 when the actuator block 41 rotates about the axis A×h.

The plurality of arms 42 are aligned in the Z direction along the axis A×h with the gaps interposed therebetween. The plurality of arms 42 extend substantially in parallel. The arm 42 is formed in a plate-like shape disposed substantially perpendicularly to the Z direction. That is, the plurality of magnetic disks 12 and the plurality of arms 42 are disposed substantially in parallel.

When the carriage 35 including the arms 42 rotates in one direction about the axis A×h, each of the plurality of arms 42 can enter a gap between the two neighboring magnetic disks 12 among the plurality of magnetic disks 12. When the carriage 35 rotates in the other direction about the axis A×h, each of the plurality of arms 42 can exit from the gap between the two neighboring magnetic disks 12.

Figure 3:
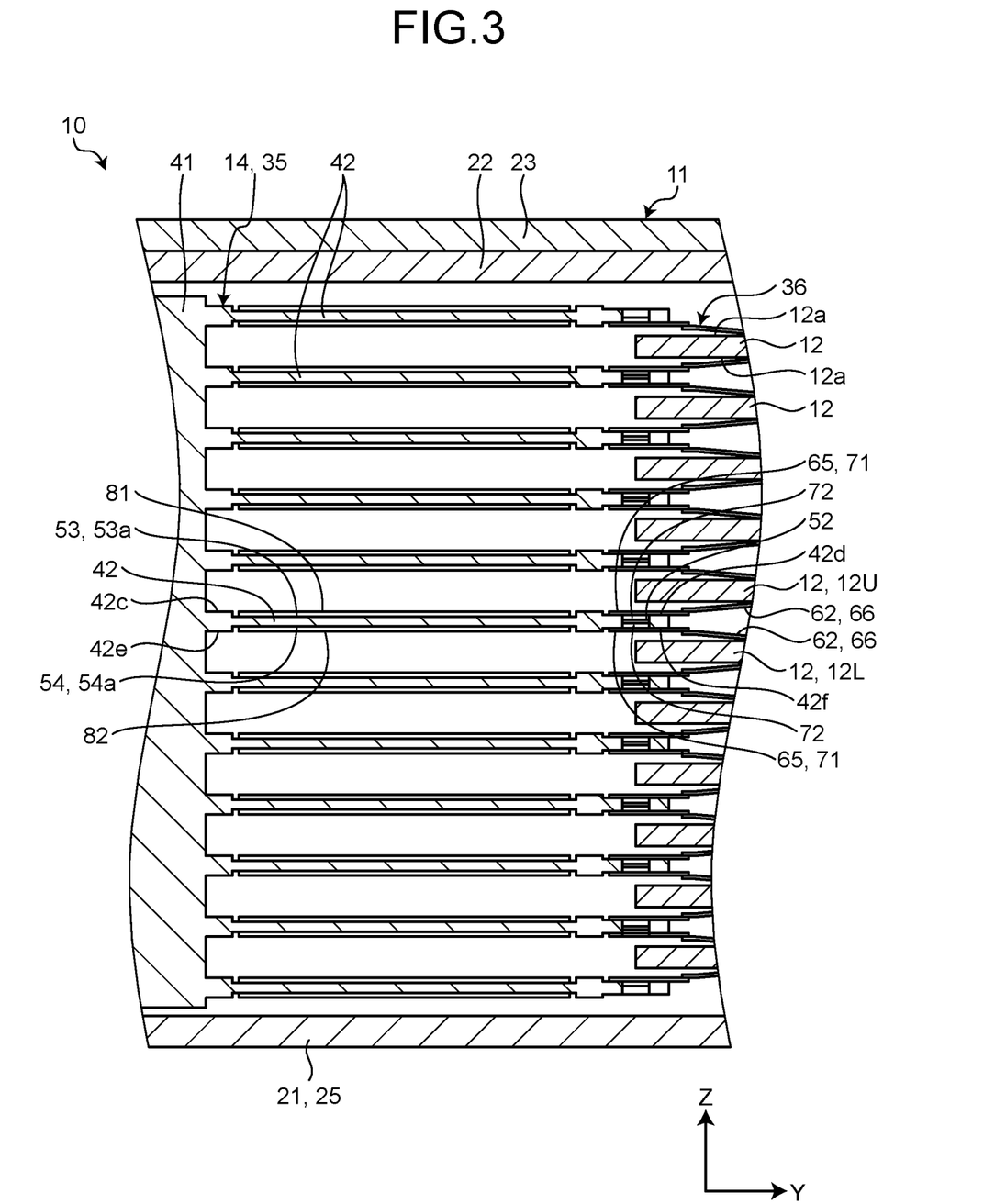
FIG. 3 is an exemplary cross-sectional view illustrating part of the HDD according to the first embodiment.

FIG. 3 is an exemplary cross-sectional view illustrating part of the HDD 10 according to the first embodiment. As illustrated in FIG. 3, in a case where each of the plurality of arms 42 is described, the two neighboring magnetic disks 12 of the plurality of magnetic disks 12 are referred to as magnetic disks 12U and 12L. The magnetic disk 12U is an example of a magnetic disk and a first magnetic disk. The magnetic disk 12L is an example of a second magnetic disk.

The one arm 42 to be described enters between the two magnetic disks 12U and 12L when the carriage 35 including the arms 42 rotates about the axis A×h. The magnetic disk 12U is spaced apart from the arm 42 in the +Z direction. The magnetic disk 12L is spaced apart from the arm 42 in the −Z direction.

Each of the plurality of magnetic disks 12 can be the magnetic disk 12U for any one of the arms 42, and the magnetic disk 12L for another one of the arms 42. For the sake of description, FIG. 3 illustrates one of the plurality of magnetic disks 12 as the magnetic disk 12O, and illustrates another one of the plurality of magnetic disks 12 as the magnetic disk 12L.

The coil holder 43 in FIG. 1 protrudes from the actuator block 41 in the −Y direction. The coil holder 43 holds a voice coil of the VCM 15. The VCM 15 includes the voice coil, a pair of yokes, and magnets provided to the yokes.

Each of the plurality of arms 42 has a first side surface 42a, a second side surface 42b, a first surface 42c, and a first seating surface 42d illustrated in FIG. 2, and a second surface 42e and a second seating surface 42f illustrated in FIG. 3. The first seating surface 42d is an example of a seating surface.

The first side surface 42a illustrated in FIG. 2 faces substantially the −X direction. That is, the first side surface 42a faces the axis A×d. Note that, when the carriage 35 rotates about the axis A×h, the first side surface 42a may not temporarily face the axis A×d.

The second side surface 42b is located on the opposite side to the first side surface 42a. The second side surface 42b faces substantially the +X direction. The first side surface 42a and the second side surface 42b approach each other toward the end portions of the arms 42 in the +Y direction. That is, the arms 42 are tapered in the +Y direction between the first side surface 42a and the second side surface 42b.

The first side surface 42a continues to the side surface 41b of the actuator block 41. Note that the first side surface 42a is not limited to this example. Since the notch 45 is provided in the actuator block 41, the first side surface 42a is longer than the second side surface 42b.

The first surface 42c and the first seating surface 42d are formed substantially flat, and face substantially the +Z direction. The first surface 42c and the first seating surface 42d face the magnetic disk 12U. Note that, when the carriage 35 rotates about the axis A×h, the first surface 42c and the first seating surface 42d may not temporarily face the magnetic disk 12U.

The first seating surface 42d is provided at the end portions of the arms 42 in the +Y direction. Therefore, the first seating surface 42d is spaced farther apart from the axis A×h than the first surface 42c. Furthermore, the first seating surface 42d is spaced farther apart from the magnetic disk 12U than the first surface 42c.

As illustrated in FIG. 3, the second surface 42e is located on the opposite side to the first surface 42c. The second seating surface 42f is located on the opposite side to the first seating surface 42d. The second surface 42e and the second seating surface 42f are formed substantially flat, and face substantially the −Z direction.

The second surface 42e and the second seating surface 42f face the magnetic disk 12L. Note that, when the carriage 35 rotates about the axis A×h, the second surface 42e and the second seating surface 42f may not temporarily face the magnetic disk 12L.

The second seating surface 42f is provided at the end portions of the arms 42 in the +Y direction. Hence, the second seating surface 42f is spaced farther apart from the axis A×h than the second surface 42e. Furthermore, the second seating surface 42f is spaced farther apart from the magnetic disk 12L than the second surface 42e.

Each of the plurality of arms 42 is provided with a slit 51, a through-hole 52, and a first depression 53 illustrated in FIG. 2, and a second depression 54 illustrated in FIG. 3. The first depression 53 and the second depression 54 may also be referred to as steps or cutouts. Note that the second depression 54 may be omitted from the arm 42.

As illustrated in FIG. 2, the slit 51 is provided on the second side surface 42b. The slit 51 is spaced apart from the first surface 42c and the second surface 42e, and extends substantially linearly between both of the end portions of the second side surface 42b in the Y direction.

The through-hole 52 penetrates the arms 42 in substantially the +Z direction so as to be opened in the first seating surface 42d and the second seating surface 42f. The through-hole 52 is a substantially circular hole. Note that the shape of the through-hole 52 is not limited to this example. The through-hole 52 is spaced apart from the axis A×h than the slit 51.

The first depression 53 is provided in the first surface 42c, and expands to reach the first side surface 42a. Hence, the first depression 53 is opened in the first side surface 42a and the first surface 42c. The entire first depression 53 is closer to the axis A×d than the slit 51 in the direction perpendicular to the axis A×d. Furthermore, the first depression 53 is spaced apart from the first seating surface 42d and the actuator block 41.

The second depression 54 is provided on the second surface 42e, and expands to reach the first side surface 42a. Hence, the second depression 54 is opened in the first side surface 42a and the second surface 42e. The entire second depression 54 is closer to the axis A×d than the slit 51 in the direction perpendicular to the axis A×d. Furthermore, the second depression 54 is spaced apart from the second seating surface 42f and the actuator block 41.

The arm 42 further includes the bottom surface 53a of the first depression 53, and a bottom surface 54a of the second depression 54. The bottom surface 53a is an example of an attachment surface. The bottom surface 53a is provided at the bottom of the first depression 53 in the Z direction. Hence, the first seating surface 42d is spaced farther apart from the axis A×h than the bottom surface 53a. The bottom surface 54a is provided at the bottom of the second depression 54 in the Z direction. Hence, the second seating surface 42f is spaced farther apart from the axis A×h than the bottom surface 54a.

The bottom surface 53a is formed substantially flat, and faces substantially the +Z direction. The bottom surface 53a faces the magnetic disk 12O. The bottom surface 53a is spaced farther apart from the magnetic disk 12U than the first surface 42c in the Z direction. Furthermore, the bottom surface 53a is spaced farther apart from the magnetic disk 12U than the first seating surface 42d in the Z direction.

Hence, the depth of the first depression 53 is larger than a distance between the first surface 42c and the first seating surface 42d in the Z direction along the axis A×h.

The bottom surface 54a is formed substantially flat, and faces substantially the −Z direction. The bottom surface 54a faces the magnetic disk 12L. The bottom surface 54a is spaced farther apart from the magnetic disk 12L than the second surface 42e in the Z direction. Furthermore, the bottom surface 54a is spaced farther apart from the magnetic disk 12L than the second seating surface 42f in the Z direction. Hence, the depth of the second depression 54 is larger than a distance between the second surface 42e and the second seating surface 42f in the Z direction along the axis A×h.

An edge 53b of the first depression 53 on the first surface 42c and an edge 54b of the second depression 54 on the second surface 42e are in mirror symmetry with respect to each other. The depth of the first depression 53 is substantially equal to the depth of the second depression 54 in the Z direction along the axis A×h. Hence, the first depression 53 and the second depression 54 according to the first embodiment are in mirror symmetry with respect to each other.

Each of the first depression 53 and the second depression 54 is not in line symmetry with respect to a center line L in the projection view seen from the Z direction along the axis A×h as illustrated in FIG. 2. The center line L is a virtual straight line that extends between the axis A×h and the center of the through-hole 52.

In the present embodiment, the first depression 53 and the second depression 54 are tapered from the first side surface 42a toward the second side surface 42b. That is, the width of the first depression 53 on the first side surface 42a is larger than the width of the end portion of the first depression 53 that is spaced the farthest apart from the first side surface 42a.

The first depression 53 and the second depression 54 are partially disposed in the notch 45 of the actuator block 41. In other words, part of the first depression 53 and the second depression 54 are closer to the axis A×h than the side surface 41a of the actuator block 41 in the Y direction.

Each of the plurality of HGAs 36 is attached to the first seating surface 42d or the second seating surface 42f so as to protrude from the arm 42 in substantially the +Y direction. As a result, the plurality of HGAs 36 are aligned in the Z direction along the axis A×h with gaps interposed therebetween. The HGA 36 attached to the first seating surface 42d is formed in substantially mirror symmetry with respect to the HGA 36 attached to the second seating surface 42f.

Each of the plurality of HGAs 36 includes a magnetic head 61 and a suspension 62. That is, the HDD 10 includes a plurality of the magnetic heads 61 and a plurality of the suspensions 62. The magnetic head 61 may also be referred to as a slider.

The magnetic head 61 records and plays back information on corresponding one of the recording surfaces 12a of the plurality of magnetic disks 12. In other words, the magnetic head 61 reads and writes information from and in the magnetic disk 12.

The suspension 62 is attached to the arm 42, and holds the magnetic head 61. The suspension 62 includes a base plate 65, a load beam 66, and a flexure 67.

The base plate 65 and the load beam 66 are made of, for example, stainless steel (SUS). Note that the material of the base plate 65 and the load beam 66 is not limited to this example. The base plate 65 and the load beam 66 may be made of materials different from each other.

The base plate 65 includes a plate 71 and a boss 72. The plate 71 is formed in a substantially quadrangular plate-like shape disposed substantially perpendicularly to the Z direction. The plate 71 is supported by the first seating surface 42d or the second seating surface 42f.

The boss 72 protrudes from the plate 71. The boss 72 is formed in a substantially cylindrical shape, and is fitted into the through-hole 52 of the arm 42. The boss 72 is caulked to the arm 42. That is, the suspension 62 is partially fitted into the through-hole 52, and thereby attached to the arm 42. Note that the suspension 62 may be attached to the arm 42 by another method.

The load beam 66 is formed in a plate-like shape thinner than the base plate 65. The load beam 66 is fixed to the plate 71 by, for example, spot welding. The load beam 66 extends from the plate 71 in substantially the +Y direction.

The flexure 67 is a kind of a flexible printed wiring board formed in a thin elongated belt shape. The flexure 67 includes, for example, a gimbal portion 75 and a suspension tail 76.

The gimbal portion 75 is provided at the end portion of the flexure 67 in the +Y direction. The gimbal portion 75 is elastically rotatably supported by the load beam 66, and the magnetic head 61 is attached thereto. The suspension tail 76 extends from the gimbal portion 75 toward the actuator block 41. Note that another portion may be provided between the gimbal portion 75 and the suspension tail 76. The suspension tail 76 is partially accommodated in the slit 51.

The end portion of the suspension tail 76 in the −Y direction is connected to the one end portion of the FPC 37 attached to the actuator block 41. In other words, part of the suspension tail 76 extends between the gimbal portion 75 and the FPC 37 through the slit 51. The other end portion of the FPC 37 is connected to, for example, a connector provided to the bottom wall 25.

The carriage 35 rotates about the axis A×h to move the magnetic head 61 with respect to the corresponding magnetic disk 12. The VCM 15 rotates the carriage 35 about the axis A×h to move the magnetic head 61 to a desired position along the recording surface 12a of the magnetic disk 12.

When rotation of the HSA 14 caused by the VCM 15 moves the magnetic head 61 to the outer edge of the magnetic disk 12, the ramped loading mechanism 16 in FIG. 1 holds the magnetic head 61 at a position spaced apart from the magnetic disk 12.

The PCB 17 in FIG. 1 is, for example, a rigid board such as a glass epoxy board, a multilayer board, a build-up board, or the like. The PCB 17 is disposed outside the housing 11 and attached to the bottom wall 25.

Various electronic parts such as a relay connector that is electrically connected to the FPC 37, an interface (I/F) connector that is connected to a host computer, and a controller that controls an operation of the HDD 10 are mounted on the PCB 17. The relay connector is electrically connected to the FPC 37 via a connector provided on the bottom wall 25.

The controller of the PCB 17 drives the VCM 15 to rotate the HSA 14 about the axis A×h. As a result, the controller controls the position of the magnetic head 61. The controller may adjust the position of the magnetic head 61 by a piezoelectric element provided to the HGA 36.

Figure 4:
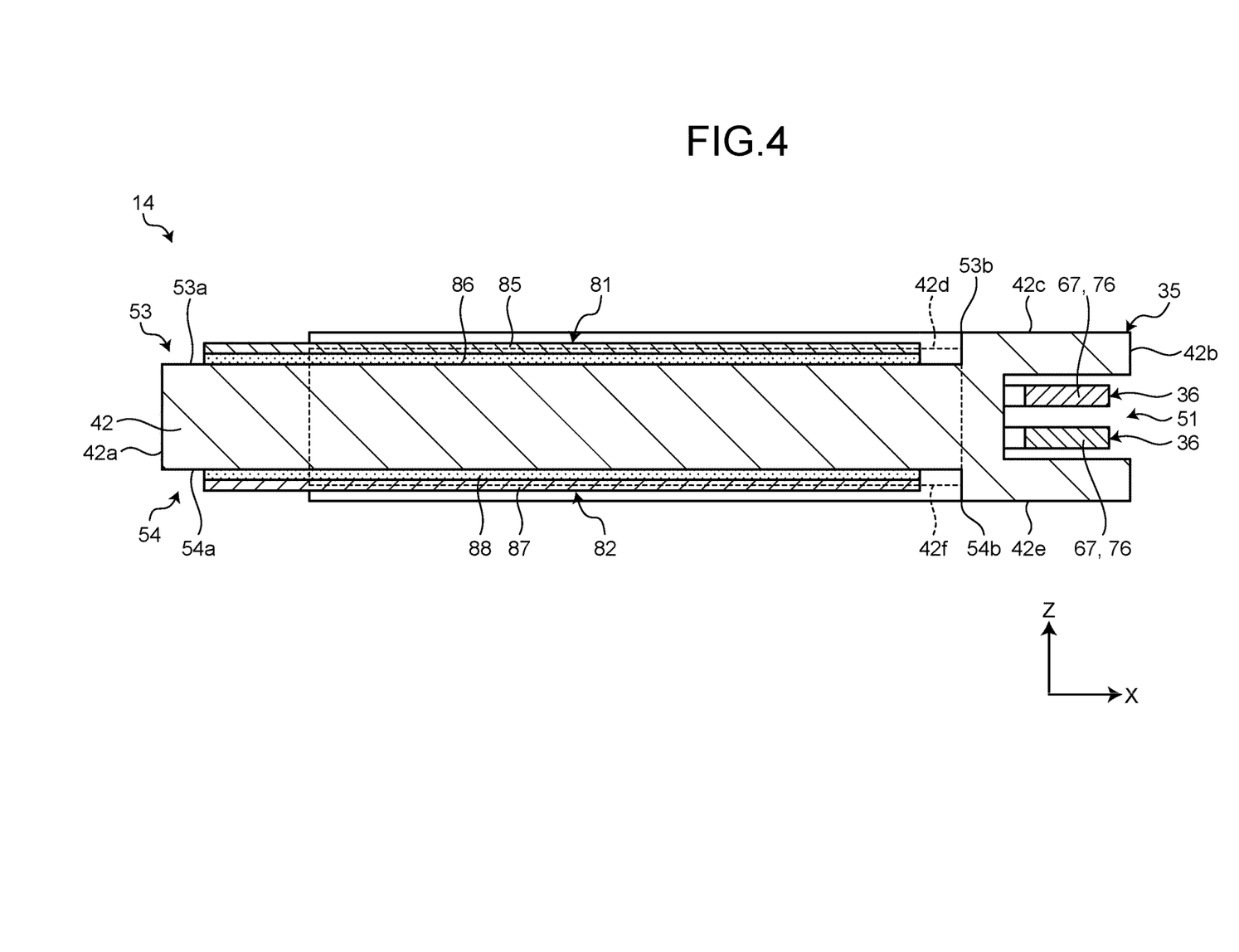
FIG. 4 is an exemplary cross-sectional view illustrating the HSA according to the first embodiment along line F4-F4 of FIG. 2.

FIG. 4 is an exemplary cross-sectional view illustrating the HSA 14 according to the first embodiment along line F4-F4 of FIG. 2. As illustrated in FIG. 4, the HSA 14 further includes a plurality of first dampers 81 and a plurality of second dampers 82. The first damper 81 is an example of a damper. The one first damper 81 and the one second damper 82 are attached to the one arm 42.

Each of the plurality of the first dampers 81 includes a constrained layer 85 and a viscoelastic material (VEM) 86. Note that the first damper 81 is not limited to this example.

The constrained layer 85 is formed in a plate-like shape disposed substantially perpendicularly to the Z direction. The constrained layer 85 is made of, for example, stainless steel. Hence, the density (mass per unit volume) of the constrained layer 85 is approximately three times the density of the arm 42. That is, the constrained layer 85 has a higher density than that of the arm 42. Note that the material of the constrained layer 85 is not limited to this example.

The viscoelastic material 86 has lower rigidity than the constrained layer 85. The viscoelastic material 86 is located between the constrained layer 85 and the bottom surface 53a of the first depression 53, and adheres to the constrained layer 85 and the bottom surface 53a. That is, the viscoelastic material 86 is interposed between the constrained layer 85 and the bottom surface 53a of the arm 42. As a result, the first damper 81 is disposed in the first depression 53, and attached to the bottom surface 53a of the arm 42.

As illustrated in FIG. 2, in the projection view seen from the Z direction along the axis A×h, the shape of the first damper 81 is substantially equal to the shape of the first depression 53, and is smaller than the first depression 53. Hence, the first damper 81 is not in line symmetry with respect to the center line L in the projection view seen from the Z direction along the axis A×h.

As illustrated in FIG. 4, the thickness of the first damper 81 is smaller than the depth of the first depression 53 in the Z direction along the axis A×h. Hence, the entire first damper 81 is accommodated in the first depression 53. Note that part of the first damper 81 may be located outside the first depression 53.

For example, the depth of the first depression 53 is three times the thickness of the constrained layer 85 in the Z direction. Furthermore, the thickness of the viscoelastic material 86 is substantially equal to the thickness of the constrained layer 85. Note that the thicknesses of the constrained layer 85 and the viscoelastic material 86 are not limited to this example.

The second damper 82 is provided in substantially mirror symmetry with respect to the first damper 81. For example, each of the plurality of second dampers 82 includes a constrained layer 87 and a viscoelastic material 88. The constrained layer 87 is formed in a plate-like shape disposed substantially perpendicularly to the Z direction. The constrained layer 87 is made of, for example, stainless steel. Note that the material of the constrained layer 87 is not limited to this example.

The viscoelastic material 88 has lower rigidity than that of the constrained layer 87. The viscoelastic material 88 is located between the constrained layer 87 and the bottom surface 54a of the second depression 54, and adheres to the constrained layer 87 and the bottom surface 54a. That is, the viscoelastic material 88 is interposed between the constrained layer 87 and the bottom surface 54a of the arm 42. As a result, the second damper 82 is disposed in the second depression 54, and attached to the bottom surface 54a of the arm 42.

In the projection view seen from the Z direction along the axis A×h, the shape of the second damper 82 is substantially equal to the shape of the second depression 54, and is smaller than the second depression 54. Hence, the second damper 82 is not in line symmetry with respect to the center line L in the projection view seen from the Z direction along the axis A×h.

The thickness of the second damper 82 is smaller than the depth of the second depression 54 in the Z direction along the axis A×h. Hence, the entire second damper 82 is accommodated in the second depression 54. Note that part of the second damper 82 may be located outside the second depression 54.

For example, the depth of the second depression 54 is three times the thickness of the constrained layer 87 in the Z direction. Furthermore, the thickness of the viscoelastic material 88 is substantially equal to the thickness of the constrained layer 87. Note that the thicknesses of the constrained layer 87 and the viscoelastic material 88 are not limited to this example.

For example, the thickness of each of the constrained layers 85 and 87 and the viscoelastic materials 86 and 88 is approximately 50 μm. The depths of the first depression 53 and the second depression 54 are approximately 150 μm. The thickness of the arm 42 between the first surface 42c and the second surface 42e is 0.8 mm. The thickness of the arm 42 between the first seating surface 42d and the second seating surface 42f is approximately 0.6 mm. The thickness of the arm 42 between the bottom surface 53a and the bottom surface 54a is approximately 0.5 mm. Note that the above dimensions are not limited to this example.

When the arm 42 vibrates, vibration of the arm 42 transmits to the first damper 81 and the second damper 82. As a result, the constrained layers 85 and 87 vibrate with respect to the arm 42. The viscoelastic materials 86 and 88 deform between the constrained layers 85 and 87 and the arm 42, and convert vibration energy into heat. As a result, the first damper 81 and the second damper 82 dampen the vibration of the arm 42.

Since the first damper 81 and the second damper 82 dampen the vibration of the arm 42, the HDD 10 can accurately position the magnetic head 61 even when the recording density is high. That is, the HDD 10 can improve the recording density.

The first damper 81 is disposed in the first depression 53, and the second damper 82 is disposed in the second depression 54. As a result, at a portion at which the first damper 81 and the second damper 82 are attached to the arm 42, a sum of the thicknesses of the arm 42, the first damper 81, and the second damper 82 becomes small, and the distance between the first damper 81 and the magnetic disk 12U is sufficiently provided. Furthermore, a sufficient distance is provided between the second damper 82 and the magnetic disk 12L.

Hereinafter, a formation method of the first depression 53 and the second depression 54 that is part of the method for manufacturing the HDD 10 will be exemplified with reference to FIGS. 5 and 6. Note that the formation method of the first depression 53 and the second depression 54 is not limited to the following method, and other methods may be used.

Figure 5:
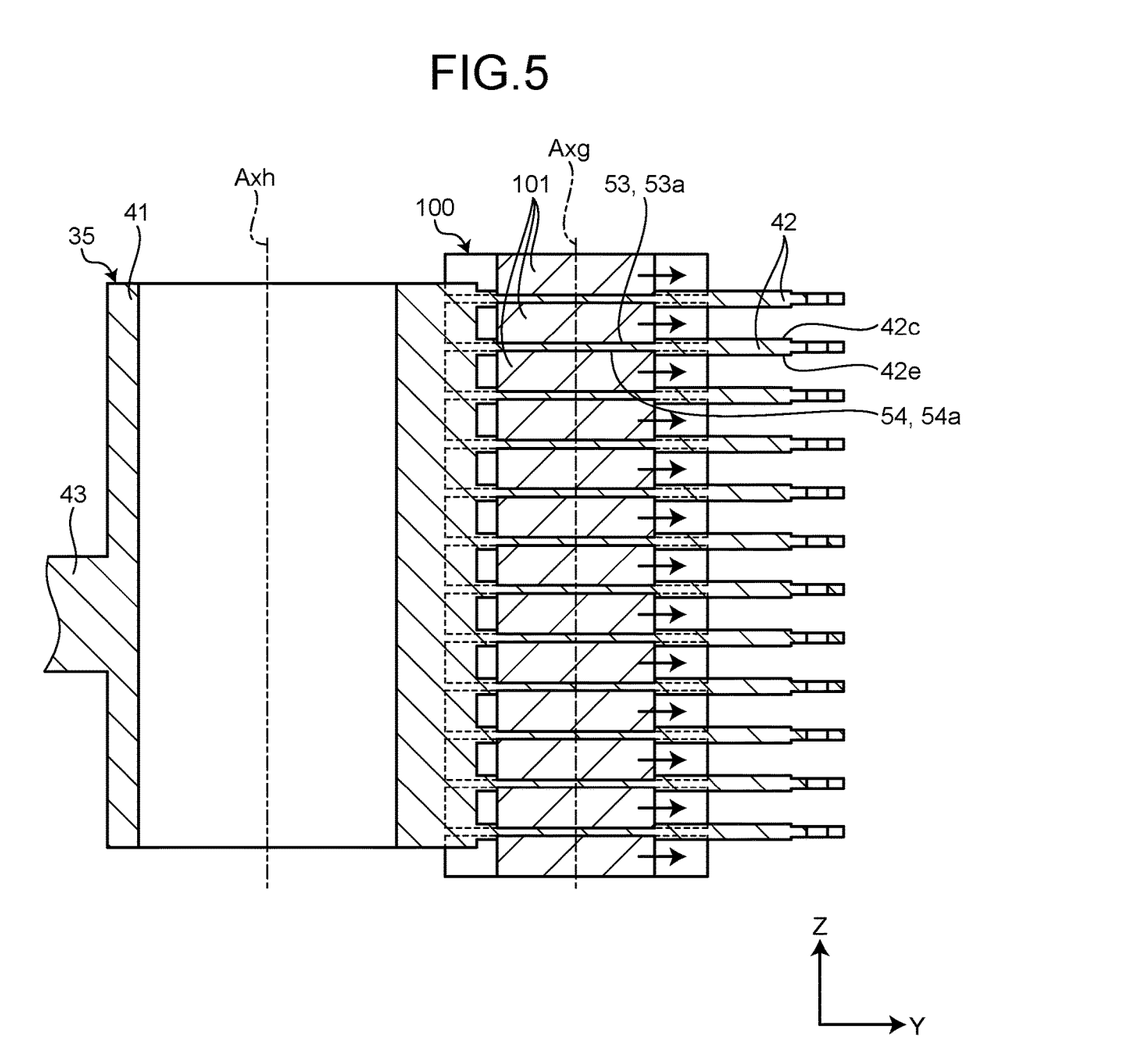
FIG. 5 is an exemplary cross-sectional view illustrating a carriage and a gang cutter according to the first embodiment.

FIG. 5 is an exemplary cross-sectional view illustrating the carriage 35 and a gang cutter 100 according to the first embodiment. FIG. 6 is an exemplary plan view illustrating the carriage 35 and the gang cutter 100 according to the first embodiment.

Figure 6:
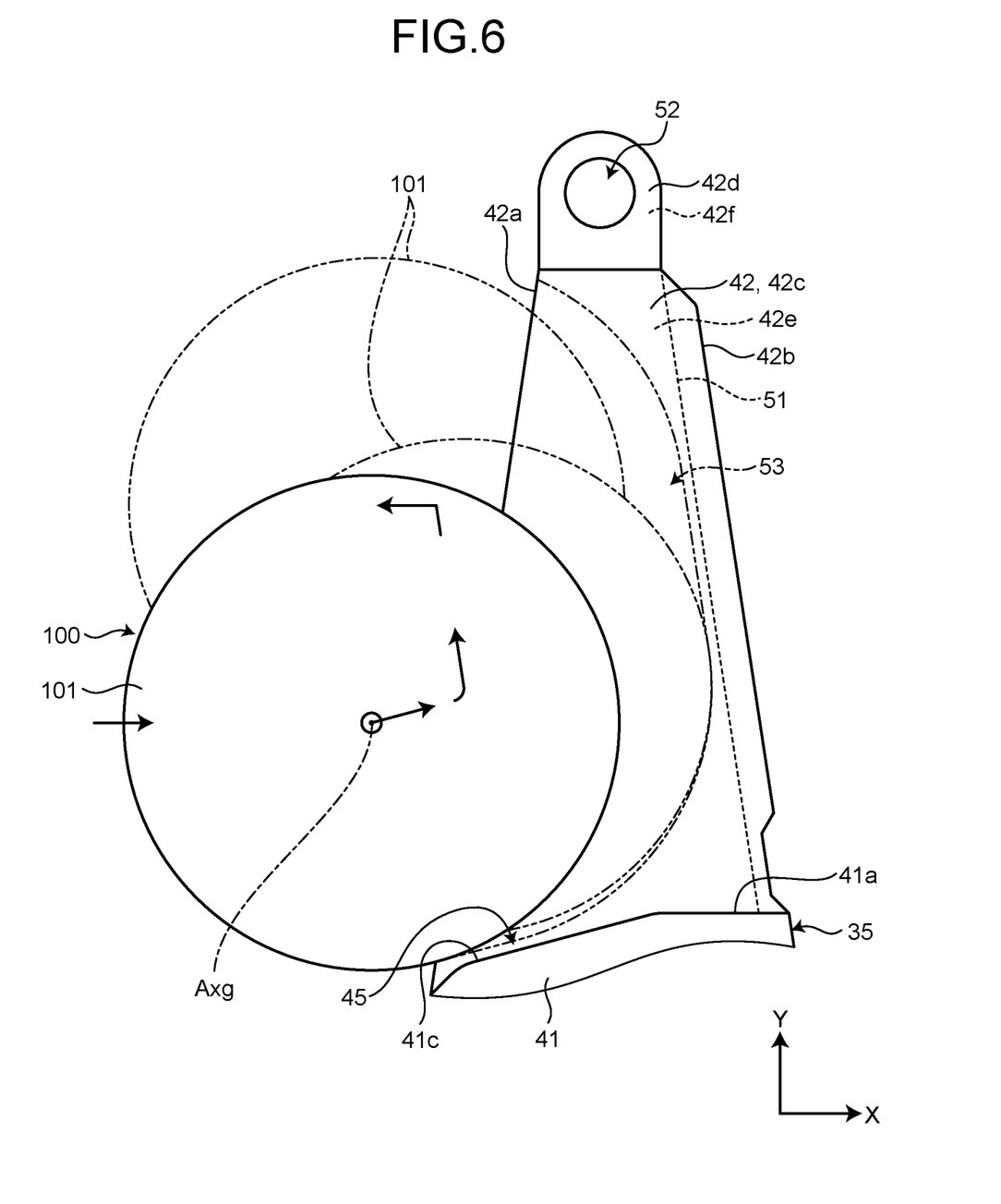
FIG. 6 is an exemplary plan view illustrating the carriage and the gang cutter according to the first embodiment.

As illustrated in FIGS. 5 and 6, for example, the gang cutter 100 forms the first depression 53 and the second depression 54 in the arm 42. The gang cutter 100 includes a plurality of blades 101. The blade 101 is formed in a substantially disk shape.

As illustrated in FIG. 5, the plurality of blades 101 are aligned along a axis A×g of the blade 101 with gaps interposed therebetween. The plurality of blades 101 integrally rotate about the axis A×g. In the present embodiment, the axis A×g extends in substantially the Z direction.

The thickness of the blade 101 is larger than a distance between the two neighboring arms 42 of the plurality of arms 42. In the present embodiment, the center of the blade 101 in the Z direction is disposed at the center between the two neighboring arms 42.

The blade 101 can simultaneously contact the two neighboring arms 42. Hence, the blade 101 that rotates about the axis A×g simultaneously cuts the two arms 42. A sum of the depth of the first depression 53, the depth of the second depression 54, and the distance between the two neighboring arms 42 is substantially equal to the thickness of the blade 101 in the Z direction.

Arrows in FIG. 6 indicate an example of a movement route of the axis A×g with respect to the arm 42 when the gang cutter 100 cuts the arm 42. As illustrated in FIG. 6, the blade 101 cuts the arm 42 from the first side surface 42a, and thereby forms the first depression 53 in one of the two arms 42 and forms the second depression 54 in the other one of the two arms 42. Since the blade 101 has the disk shape, the first depression 53 and the second depression 54 are tapered from the first side surface 42a toward the second side surface 42b.

A distance between the first side surface 42a and the slit 51 in the X direction is smaller than the radius of the blade 101. Consequently, the blade 101 can form the first depression 53 and the second depression 54 that expand from the first side surface 42a to the vicinity of the slit 51. Note that the distance between the first side surface 42a and the slit 51 may be larger than the radius of the blade 101.

For example, the one blade 101 pushes the one arm 42 in substantially the −Z direction when forming the first depression 53 in the one arm 42. In other words, a force that bends the one arm 42 acts from the one blade 101 to the one arm 42. However, the other one blade 101 forms the second depression 54 in the one arm 42, and thereby pushes the one arm 42 in substantially the +Z direction. That is, the two blades 101 support the one arm 42 from both sides, and thereby restrict the one arm 42 from elastically bending.

The first seating surface 42d and the second seating surface 42f of the arm 42 can be formed by the gang cutter 100 similar to the first depression 53 and the second depression 54. For example, the gang cutter 100 can scrape the arm 42 using another blade having the thickness different from that of the blade 101, and form the first seating surface 42d and the second seating surface 42f.

The thickness of the arm 42 between the first seating surface 42d and the second seating surface 42f is set to be larger than a sum of the thicknesses of the two bosses 72 fitted into the through-hole 52 in the Z direction. Hence, the two bosses 72 are prevented from interfering with each other. However, the thickness of the arm 42 between the first seating surface 42d and the second seating surface 42f is restricted in terms of design.

On the other hand, the thickness of the arm 42 between the bottom surface 53a of the first depression 53 and the bottom surface 54a of the second depression 54 hardly affects the interference between the two bosses 72 in the through-hole 52. Hence, the depths of the first depression 53 and the second depression 54 are less restricted in terms of design than the thickness of the arm 42 between the first seating surface 42d and the second seating surface 42f. Consequently, the depths of the first depression 53 and the second depression 54 can be set to such depths that the first damper 81 and the second damper 82 can be prevented from contacting the magnetic disks 12U and 12L.

In the HDD 10 according to the first embodiment described above, each arm 42 includes the first side surface 42a, the second side surface 42b, the first surface 42c, the first seating surface 42d, the second surface 42e, and the second seating surface 42f. The first side surface 42a faces the axis A×d of the magnetic disk 12. The second side surface 42b with the slit 51 is opposite to the first side surface 42a. The first surface 42c and the first seating surface 42d face the magnetic disk 12U. The second surface 42e and the second seating surface 42f face the magnetic disk 12L. The first seating surface 42d is spaced farther apart from the magnetic disk 12U and the axis A×h of the arm 42 than the first surface 42c. The second seating surface 42f is spaced farther apart from the magnetic disk 12L and the axis A×h than the second surface 42e. The arm 42 is provided with the first depression 53. The first depression 53 is open to the first side surface 42a and the first surface 42c, and is located closer to the axis A×d than the slit 51 in the direction perpendicular to the axis A×d. The suspension 62 is partially accommodated in the slit 51 while being supported by the first seating surface 42d or the second seating surface 42f. The first damper 81 is attached to the arm 42 along the first depression 53.

By being disposed in the first depression 53, the first damper 81 is farther spaced apart from the magnetic disk 12U than the one disposed on the first surface 42c. This makes it possible to avoid the first damper 81 from contacting the magnetic disk 12U while dampening vibration of the arm 42. In addition, the first depression 53 expands to the first side surface 42a in the arm 42b while avoiding the locations of the first seating surface 42d and the slit 51. Thus, the first depression 53 formed in the arm 42 is unlikely or less likely to affect the design and manufacturing of the first seating surface 42d supporting the suspension 62 and the slit 51 accommodating part of the suspension 62. That is, the first depression 53 will not hinder the attachment of the suspension 62 to the first seating surface 42d and the slit 51. Furthermore, the first depression 53 can be easily formed by cutting the arm 42 from the first side surface 42a with, for example, the gang cutter 100. As such, the HDD 10 according to the present embodiment becomes easily manufacturable and can provide improved recording density by improving positioning accuracy of the magnetic heads 61 on the suspensions 62.

The arm 42 is provided with the second depression 54. The second depression 54 is open to the first side surface 42a and the second surface 42e, and is located closer to the axis A×d than the slit 51 in the direction perpendicular to the axis A×d. For example, by scraping the arms 42 from the first side surfaces 42a with the blades 101 of the gang cutter 100, the first depression 53 and the second depression 54 can be formed in each of the arms 42. In this case, every two neighboring blades 101 of the gang cutter 100 support one arm 42 from both sides to simultaneously form the first depression 53 and the second depression 54 in the arm 42, thereby restricting the arm 42 from bending. In this manner, the HDD 10 according to the present embodiment allows the first depression 53 and the second depression 54 to be easily formed.

The second damper 82 is attached to the arm 42 along the second depression 54 to dampen vibration of the arm 42. Consequently, the HDD 10 according to the present embodiment can offer improved positioning accuracy of the magnetic heads 61 on the suspensions 62 by using the first dampers 81 and the second dampers 82 to dampen vibration of the arms 42.

The edge 53b of the first depression 53 in the first surface 42c and the edge 54b of the second depression 54 in the second surface 42e are in mirror symmetry with respect to each other. Consequently, the first depression 53 and the second depression 54 can be formed in each of the arms 42 by cutting the arm 42 from the first surface 42c with, for example, the blades 101 having substantially the same shape. Thus, the HDD 10 according to the present embodiment allows the first depression 53 and the second depression 54 to be easily formed.

The thickness of the first damper 81 is smaller than the depth of the first depression 53 in the Z direction along the axis A×h. Thereby, the first damper 81 can be prevented from contacting the magnetic disk 12U.

The first damper 81 includes a constrained layer 85 being higher in density than the arm 42, and a viscoelastic material 86 interposed between the constrained layer 85 and the arm 42. The depth of the first depression 53 is set to three times the thickness of the constrained layer 85 in the Z direction along the axis A×h. For example, the constrained layer 85 may be made of stainless steel while the arm 42 may be made of an aluminum alloy. The constrained layer 85 can thus have a density approximately three times the density of the arm 42. Thereby, the HDD 10 according to the present embodiment can reduce the change in the mass of the arms 42 due to the first depressions 53 formed in the arms 42 and the first dampers 81 disposed in the first depressions 53.

The depth of the first depression 53 is larger than the distance between the first surface 42c and the first seating surface 42d in the Z direction along the axis A×h. This makes it possible for the arm 42 to maintain a desired thickness between the first seating surface 42d and the second seating surface 42f regardless of the depth of the first depression 53. As such, the first depression 53 formed in the arm 42 is unlikely or less likely to affect the design and manufacturing of the first seating surface 42d supporting the suspension 62. Namely, the first depression 53 will not hinder the attachment of the suspension 62 to the first seating surface 42d.

The arm 42 is provided with the through-hole 52 open to the first seating surface 42d and the second seating surface 42f. The suspension 62 is attached to the arm 42 by partially fitting into the through-hole 52. In the projection view seen from the Z direction along the axis A×h, the first damper 81 is not in line symmetry with respect to the center line L extending between the axis A×h and the center of the through-hole 52. This makes it possible to easily form the first depression 53 by cutting the arm 42 from the first side surface 42a using, for example, the gang cutter 100. In addition, the shape of the first damper 81 is not limited to line symmetry. Consequently, the first damper 81 can be shaped in accordance with design constraints or requests or other manufacturing constraints or requests, for example. As such, it is possible to easily manufacture the HDD 10 according to the present embodiment.

The first depression 53 is tapered from the first side surface 42a toward the second side surface 42b. Such a first depression 53 can be thus formed easily by cutting the arm 42 from the first side surface 42a with, for example, the disk-shaped blades 101 of the gang cutter 100.

Second Embodiment

Hereinafter, the second embodiment will be described with reference to FIGS. 7 and 8. Note that, in the following description of the plurality of embodiments, components having functions similar to those of the components that have been already described will be assigned the same reference numerals as those of the components that have been already described, and further description thereof will be omitted in some cases. Furthermore, the plurality of components that are assigned the same reference numerals have functions and properties all of which are not necessarily common, and may have different functions and properties according to each embodiment.

Figure 7:
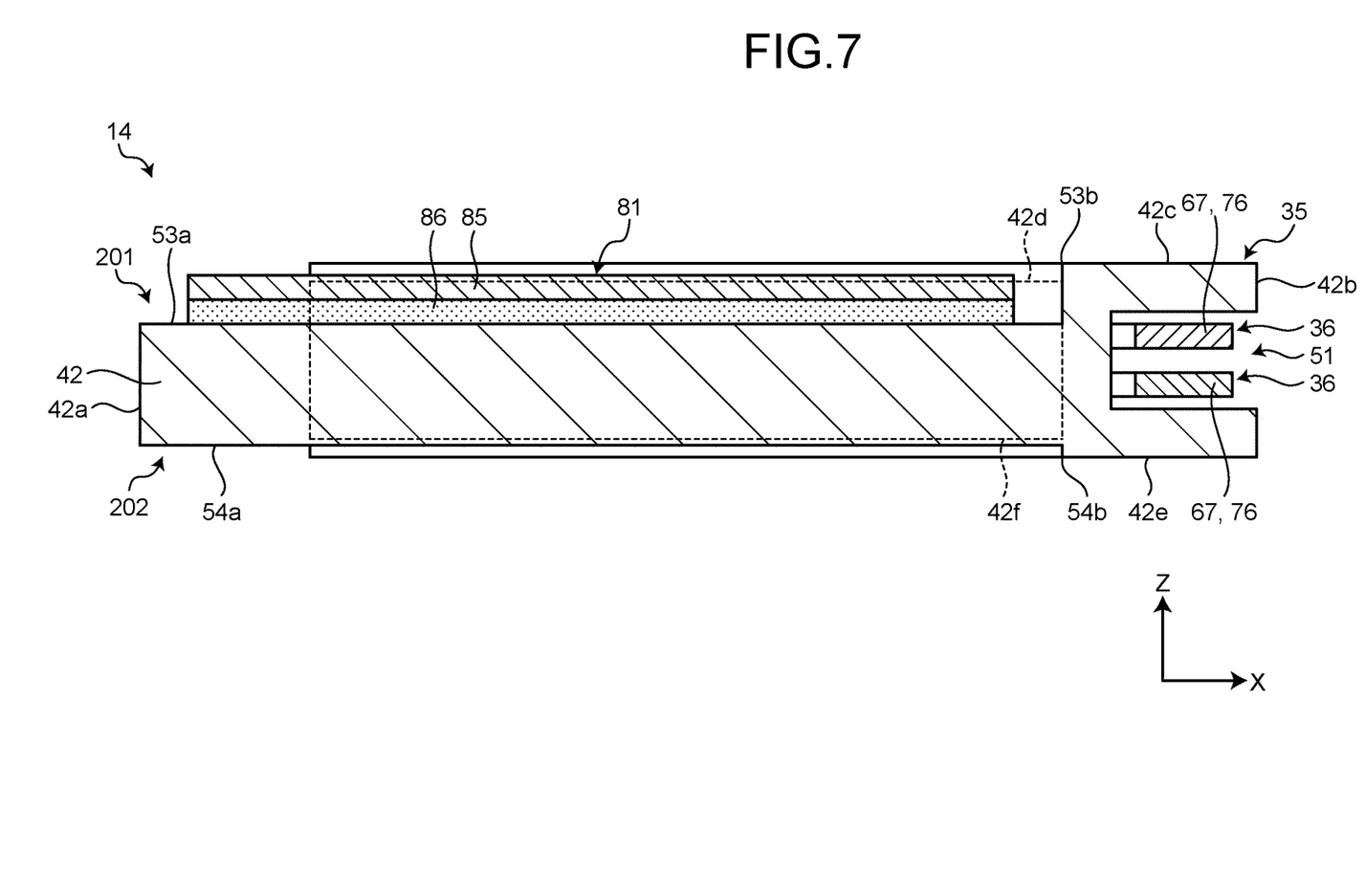
FIG. 7 is an exemplary cross-sectional view illustrating an HSA according to a second embodiment.

FIG. 7 is an exemplary cross-sectional view illustrating an HSA 14 according to the second embodiment. As illustrated in FIG. 7, a second damper 82 is omitted from the HSA 14 according to the second embodiment. Note that the HSA 14 according to the second embodiment may include the second damper 82.

An arm 42 according to the second embodiment is provided with a first depression 201 and a second depression 202 instead of a first depression 53 and a second depression 54. The first depression 201 and the second depression 202 are substantially equal to the first depression 53 and the second depression 54 except points described below.

The depth of the first depression 201 is larger than the depth of the second depression 202 in the Z direction along a axis A×h. That is, the depth of the first depression 201 is different from the depth of the second depression 202 in the Z direction along the axis A×h.

The thickness of a first damper 81 is smaller than the depth of the first depression 201 in the Z direction along the axis A×h. On the other hand, the thickness of the first damper 81 is larger than the depth of the second depression 202 in the Z direction.

Figure 8:
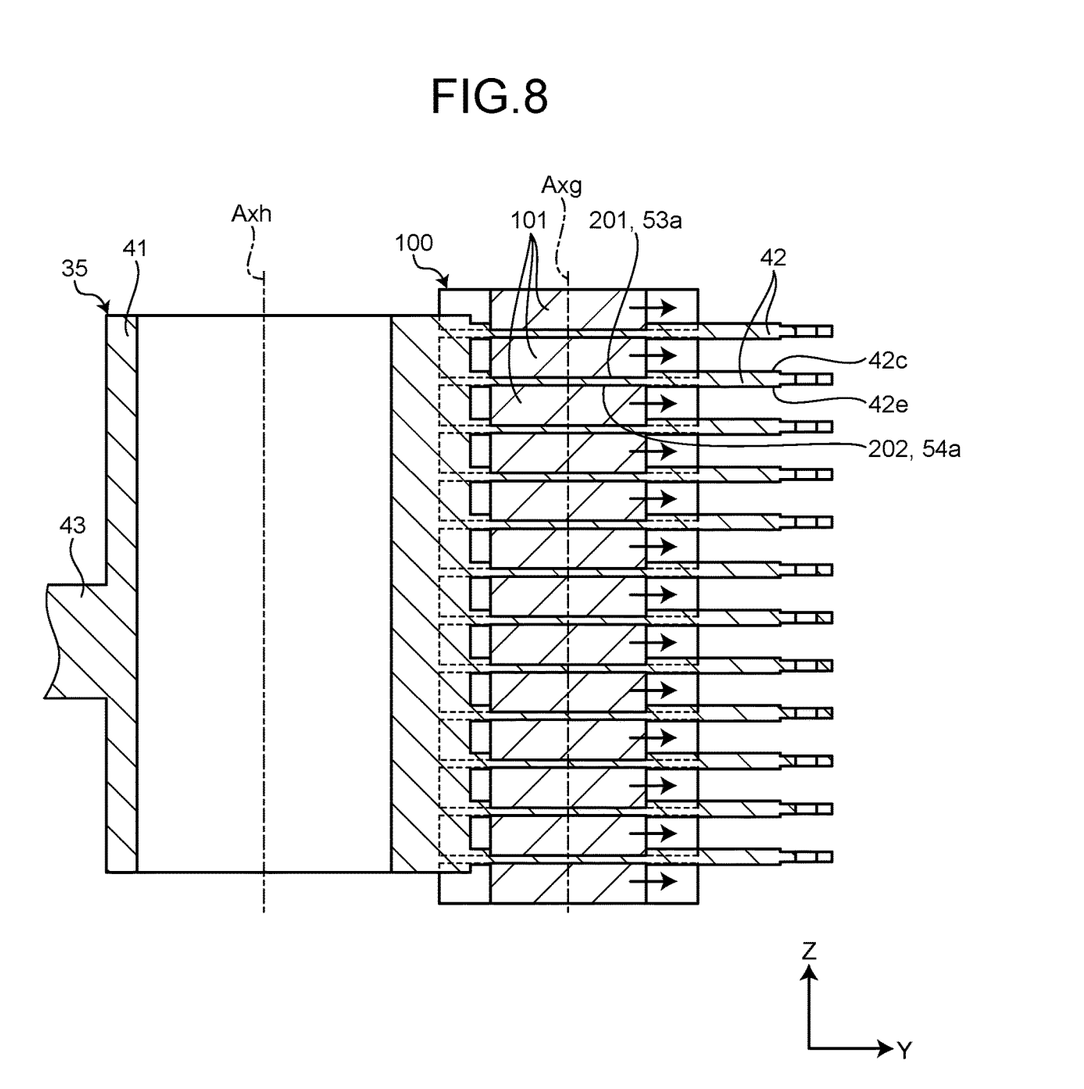
FIG. 8 is an exemplary cross-sectional view illustrating a carriage and a gang cutter according to a second embodiment.

FIG. 8 is an exemplary cross-sectional view illustrating a carriage 35 and a gang cutter 100 according to the second embodiment. As illustrated in FIG. 8, in the second embodiment, the center of a blade 101 in the Z direction is disposed at a position different from the center between the two neighboring arms 42. Consequently, the two neighboring blades 101 can simultaneously form the deep first depression 201 and the shallow second depression 202 in each of the plurality of arms 42.

Although the second depression 202 is shallow, the blade 101 contacts the arm 42 to form the second depression 202. Consequently, similar to the first embodiment, the two blades 101 support the one arm 42 from the both sides, and thereby restrict the one arm 42 from elastically bending.

In the HDD 10 according to the second embodiment described above, the first depression 201 is different in depth from the second depression 202 in the Z direction along the axis A×h. Consequently, the HDD 10 according to the present embodiment allows a distance between the first damper 81 and a magnetic disk 12U to be easily adjusted.

The first depression 201 is larger in depth than the second depression 202 in the Z direction along the axis A×h. Consequently, the first damper 81 is spaced apart from the magnetic disk 120 and can be prevented from contacting the magnetic disk 12U.

The first damper 81 has a thickness smaller than the depth of the first depression 201 and larger than the depth of the second depression 202 in the Z direction along the axis A×h. Consequently, the first damper 81 can be prevented from contacting the magnetic disk 12U. Furthermore, while the first depression 201 in which the first damper 81 is disposed is deepened, the second depression 202 in which the damper is not disposed is shallowed. Consequently, the arm 42 can be prevented from becoming excessively thin due to the first depression 201 and the second depression 202.

Third Embodiment

Figure 9:
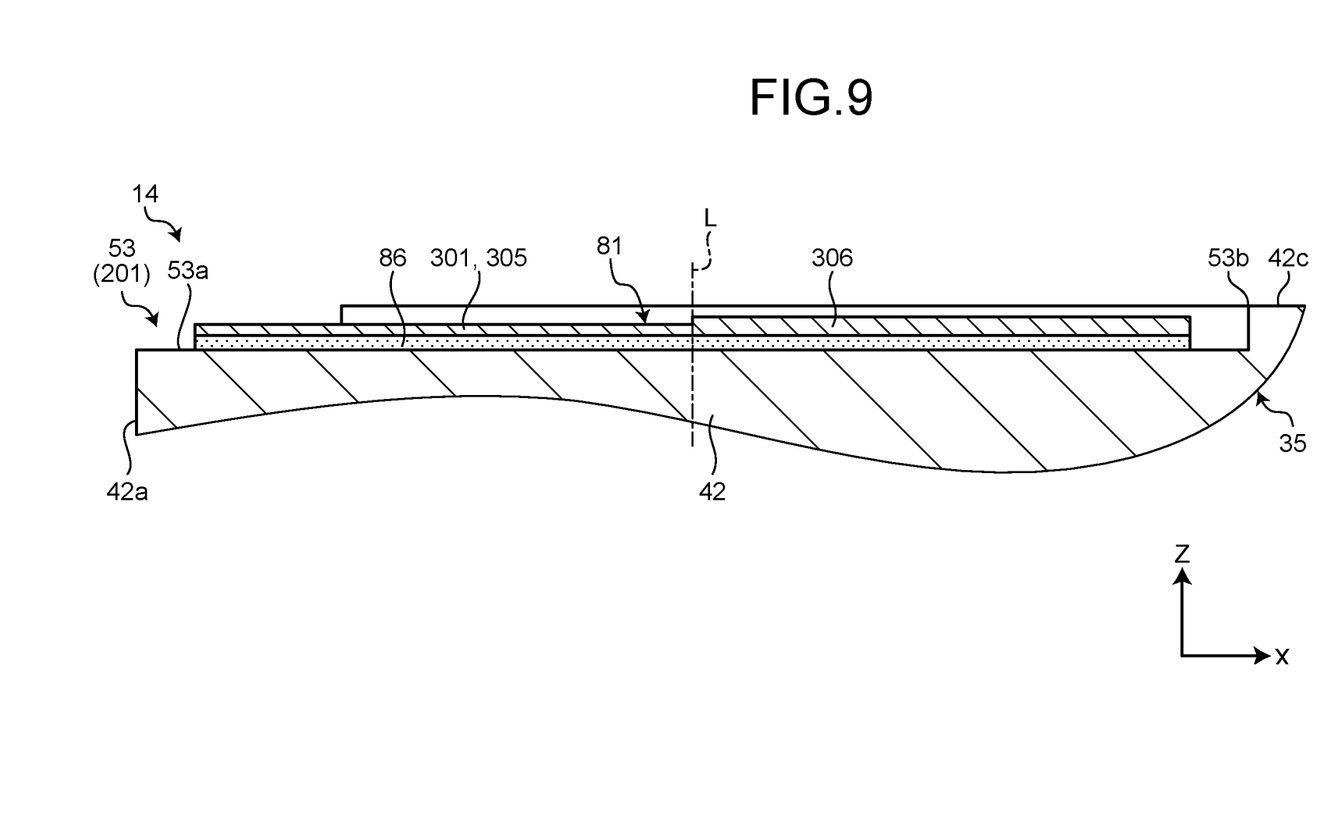
FIG. 9 is an exemplary cross-sectional view illustrating part of an HSA according to a third embodiment.

Hereinafter, the third embodiment will be described with reference to FIG. 9. FIG. 9 is an exemplary cross-sectional view illustrating part of an HSA 14 according to the third embodiment. As illustrated in FIG. 9, a first damper 81 according to the third embodiment includes a constrained layer 301 instead of a constrained layer 85. The constrained layer 301 is substantially equal to the constrained layer 85 except as points described below. The constrained layer 301 according to the third embodiment may be replaced with one of the constrained layers 85 according to the first embodiment and the second embodiment.

The constrained layer 301 includes a first part 305 and a second part 306 that is thicker than the first part 305. The first part 305 is closer to a axis A×d than the second part 306 in a direction perpendicular to the axis A×d.

For example, the first part 305 is a portion of the constrained layer 301 that is closer to the axis A×d than a center line L. The second part 306 is a portion of the constrained layer 301 that is spaced farther apart from the axis A×d than the center line L. Note that the first part 305 and the second part 306 are not limited to this example.

The constrained layer 301 is tapered from a first side surface 42*a* toward a second side surface 42*b* similar to a first depression 53. Hence, the area of the first part 305 is larger than the area of the second part 306 in the projection view seen from the Z direction along a axis A×h. On the other hand, since the second part 306 is thicker than the first part 305, the weight of the first part 305 and the weight of the second part 306 are close to each other.

The first part 305 and the second part 306 are integrally formed. However, the first part 305 and the second part 306 may be independent of each other. Furthermore, a material of the first part 305 and a material of the second part 306 may be different.

In the HDD 10 according to the third embodiment described above, the first damper 81 includes the constrained layer 301, and the viscoelastic material 86 that is interposed between the constrained layer 301 and the arm 42. The constrained layer 301 includes the first part 305 and the second part 306 being larger in thickness than the first part 305. Consequently, the HDD 10 according to the present embodiment allows the balance of the weight of the first damper 81 having an asymmetric shape to be adjusted.

The first part 305 is located closer to the axis A×d than the second part 306 in the direction perpendicular to the axis A×d. In a case where disk-shaped blades 101 of a gang cutter 100 form the first depression 53, the first depression 53 is tapered from the first side surface 42*a* toward the second side surface 42*b*, for example. That is, in a projection view seen from the Z direction along the axis A×h, the second part 306 tends to become smaller than the first part 305. However, the HDD 10 according to the present embodiment allows the balance of the weight in the first damper 81 due to the second part 306 thicker than the first part 305.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disk device comprising:
a plurality of magnetic disks being aligned along a first rotation axis and rotatable about the first rotation axis;
a plurality of arms each with a first depression, being aligned along a second rotation axis spaced apart from the first rotation axis, each of which rotates about the second rotation axis to be able to enter a gap between two neighboring magnetic disks of the plurality of magnetic disks, each arm including:
a first side surface facing the first rotation axis,
a second side surface with a slit, being opposite to the first side surface
a first surface facing a first magnetic disk of the two neighboring magnetic disks,
a second surface facing a second magnetic disk of the two neighboring magnetic disks,
a first seating surface facing the first magnetic disk, and spaced farther apart from the first magnetic disk and the second rotation axis than the first surface, and
a second seating surface facing the second magnetic disk, and spaced farther apart from the second magnetic disk and the second rotation axis than the second surface, and
the first depression being open to the first side surface and the first surface, and located closer to the first rotation axis than the slit in a direction perpendicular to the first rotation axis;
a plurality of suspensions each of which is attached to each of the plurality of arms while being supported by the first seating surface or the second seating surface and partially accommodated in the slit; and
a plurality of first dampers configured to dampen vibration of the plurality of arms, each of which is attached to each of the plurality of arms along the first depression.

2. The disk device according to claim 1, wherein
each of the plurality of arms is provided with a second depression that is open to the first side surface and the second surface and located closer to the first rotation axis than the slit in the direction perpendicular to the first rotation axis.

3. The disk device according to claim 2, further comprising
a plurality of second dampers configured to dampen vibration of the plurality of arms, each of which is attached to each of the plurality of arms along the second depression.

4. The disk device according to claim 2, wherein
the first depression is different in depth from the second depression in a direction along the second rotation axis.

5. The disk device according to claim 4, wherein
the first depression is larger in depth than the second depression in the direction along the second rotation axis.

6. The disk device according to claim 5, wherein
each of the first dampers has a thickness smaller than the depth of the first depression and larger than the depth of the second depression in the direction along the second rotation axis.

7. The disk device according to claim 2, wherein
an edge of the first depression in the first surface and an edge of the second depression in the second surface are in mirror symmetry.

8. The disk device according to claim 1, wherein
each of the first dampers has a thickness smaller than a depth of the first depression in a direction along the second rotation axis.

9. The disk device according to claim 1, wherein
each of the plurality of first dampers includes
- a constrained layer being higher in density than the plurality of arms, and
- a viscoelastic material interposed between the constrained layer and one of the plurality of arms, and the first depression has a depth three times larger than a thickness of the constrained layer in a direction along the second rotation axis.

10. The disk device according to claim 1, wherein
the first depression has a depth larger than a distance between the first surface and the first seating surface in a direction along the second rotation axis.

11. The disk device according to claim 1, wherein
each of the plurality of arms is provided with a through-hole open to the first seating surface and the second seating surface,
the plurality of suspensions are individually attached to the plurality of arms by partially fitting into the through-hole, and
in a projection view seen from a direction along the second rotation axis, each of the plurality of first dampers is not in line symmetry with respect to a virtual straight line extending between the second rotation axis and a center of the through-hole.

12. The disk device according to claim 11, wherein
the first depression is tapered from the first side surface toward the second side surface.

13. The disk device according to claim 11, wherein
each of the plurality of first dampers includes a constrained layer and a viscoelastic material interposed between the constrained layer and one of the plurality of arms, and
the constrained layer includes a first part and a second part being larger in thickness than the first part.

14. The disk device according to claim 13, wherein
the first part is located closer to the first rotation axis than the second part in a direction perpendicular to the first rotation axis.

15. A disk device comprising:
a magnetic disk being rotatable about a first rotation axis;
an arm with a depression and a through-hole, being rotatable about a second rotation axis spaced apart from the first rotation axis, the arm including
- a first surface to which the depression is open, facing the magnetic disk, in a first direction parallel to the first and second rotation axes,
- an attachment surface forming a bottom of the depression and facing the magnetic disk, and
- a seating surface to which the through-hole is open, facing the magnetic disk, spaced farther apart from the second rotation axis than the first surface, spaced farther apart from the magnetic disk in the first direction than the first surface, and spaced apart from the depression in the first direction;

a suspension being supported by the seating surface, and attached to the arm by partially fitting into the through-hole; and
a damper configured to dampen vibration of the arm, the damper being attached to the attachment surface,
wherein
the depression is not in line symmetry with respect to a virtual straight line extending between the second rotation axis and a center of the through-hole in a projection view seen from the first direction, and
the damper is not in line symmetry with respect to the virtual straight line in the projection view.

* * * * *